Jan. 24, 1967  B. E. McMILLEN  3,300,704
REGULATED ELECTRICAL SUPPLY SYSTEM
Filed Sept. 18, 1964
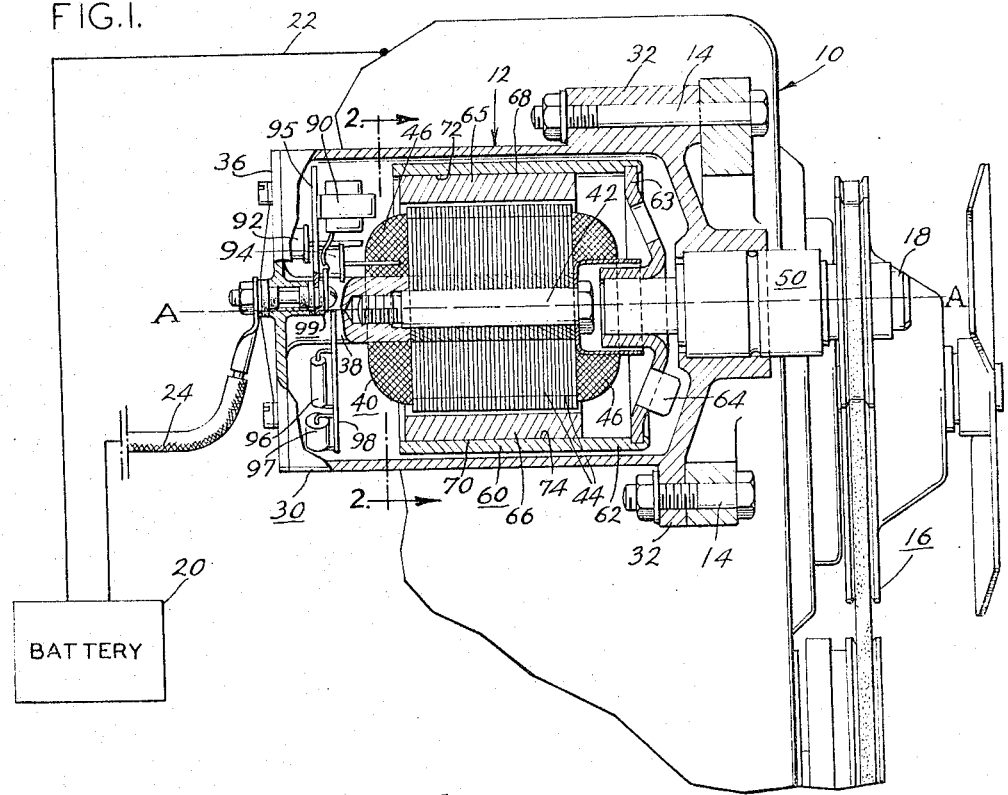
INVENTOR:
BOBBY E. McMILLEN
BY Howson & Howson
ATTYS 3,300,704
REGULATED ELECTRICAL SUPPLY SYSTEM
Bobby E. McMillen, Columbus, Miss., assignor to American Bosch Arma Corporation, Columbus, Miss., a corporation of New York
Filed Sept. 18, 1964, Ser. No. 397,494
9 Claims. (Cl. 320—61)

This application is, in part, a continuation of copending application Serial No. 352,478, filed March 17, 1964.

This invention relates to systems for providing regulated direct voltage, and particularly to such systems in which an alternating voltage is generated, rectified, regulated and applied across a storage battery.

There are many applications in which a storage battery utilized to provide electrical power for operating electrical equipment is supplied from a source of electrical power in order to maintain its charged condition. For example, such batteries and charging systems therefor are commonly utilized in land and sea vehicles to provide current for operating engine starters, to provide current for the ignition system, and also to operate electrical accessories such as radios, heaters, air-conditioner motors and lights. Ordinarily the source of power is some form of rotating magneto-electric device driven by the engine of the vehicle.

Until recent years the most common system for maintaining the storage battery charged has comprised an engine-driven direct current generator. Such generators are comparatively large and have a number of moving parts which are capable of causing troubles interfering with proper operation, requiring frequent repairs or limited useful life. Ordinarily the current and voltage output of the generator are taken off the armature by means of brushes riding on a commutator. In order to reduce the charging current supplied to the battery when the battery is fully charged and the load current supplied from the battery very low, while increasing the charging current when the battery is discharged or the load on the battery large, a regulator is often employed which intermittently opens and closes a circuit including the generator field windings. Both the regulator and the brushes mentioned above are common sources of malperformance of the system.

More recently the power for charging the battery and for supplying direct current to the electrical system has comprised an alternator driven by the engine, the output of which alternator is rectified by silicon diodes. Such alternator systems have a number of advantages over the earlier direct current generator systems. For example, the alternator is usually a smaller and lighter machine, and typically the power output thereof is taken from the stationary stator windings and regulated by controlling the strength of the rotor field. Accordingly the output power does not have to pass through a commutator and brushes, and this source of trouble is therefore eliminated. In many cases the regulator is itself simpler than is required for use with a D.C. generator. In some cases, particularly where low outputs are adequate, alternators have been employed which use fixed permanent magnets to provide a magnetic field within which the armature is rotated. In the latter case the problem of regulation arises in that there are no field windings in which the field current can be varied. To regulate the alternator using permanent magnets there have been provided arrangements in which a plurality of armature windings are utilized and one or more of these windings automatically cut out of the output circuit when the alternator operates at higher speeds. Such an arrangement only provides discrete steps of regulation, as opposed to uniform regulation over the full range of speeds of the alternator. This defect in the regulation characteristics of known permanent magnet-type alternators is often very significant particularly when accessories which are highly voltage sensitive, such as radios and other electronic equipment, are supplied with their operating voltage from the alternator circuit.

Accordingly it is an object of the invention to provide a new and useful system for generating regulated direct voltage.

Another object is to provide such a system which requires no brushes or commutators, and yet is capable of providing adequate regulation continuously throughout a substantial range of engine speeds and of load currents.

Another object is to provide such a system which employs an alternator to generate electrical power and which absorbs little power from the alternator in rectifying and regulating process.

Another object is to provide such a system which is simple and compact so as readily to be mountable within small mounting spaces, and yet is highly reliable so as not to require frequent maintenance or replacement.

Another object is to provide a new and useful electrical circuit responsive to an alternating voltage input supplied thereto to apply across a storage battery a rectified and regulated voltage.

A further object is to provide such a circuit which passes a high percentage of the power of the alternating voltage input to the battery and any load connected thereto.

It is another object to provide a system and circuit for the above purposes which is regulated against changes in ambient temperature.

These and other objects of the invention are achieved by providing a novel combination of a permanent-magnet alternator with a novel electrical circuit for rectifying and regulating the alternating voltage generated by the alternator and for applying it across a storage battery. Preferably the permanent-magnet alternator utilized in this combination is the permanent-magnet alternator described and claimed in my copending application Serial No. 352,478, filed March 17, 1964. In the latter device a permanent-magnet field is rotated about a fixed armature winding to provide an alternating output voltage from the armature winding. The output of the alternator is applied across the storage battery by way of a gate-controlled rectifier circuit which is normally non-conductive and becomes conductive only when the voltage applied across it by the alternator is of the proper polarity to charge the battery, and when the gate element of the gate-controlled rectifier circuit has been appropriately actuated by an electrical gate-control pulse. Once so rendered conductive, the rectifier circuit remains conductive until the voltage across it drops below a predetermined minimum value, at which time it returns to its non-conductive state. A source of gate-control pulses provides pulses for actuating the gate element in the recifier circuit during intervals in which the alternator voltage maintains the voltage across the rectifier circuit in the polarity for conduction therein. The time phase of occurrence of these gate-control pulses with respect to cycles of the alternator voltage determines the phase at which the controlled rectifier circuit becomes conductive. For example, if a gate-control pulse occurs as soon as the alternator voltage produces across the rectifier circuit the voltage polarity required for conduction, the phase angle at which conduction begins will be relatively large, while if it occurs just before the voltage across the rectifier circuit falls to zero the phase angle at which conduction begins will be relatively small.

If these gate-control pulses were to occur in fixed time phase with respect to the alternator voltage, electrical energy would tend to be passed by the rectifier circuit to the battery and load at substantially a constant rate despite variations in the state of charge of the battery and the magnitude of the external load, and at a varying rate with changes in amplitude of the alternating voltage. What is desired, instead, is that the rate at which electrical energy is passed by the rectifier circuit be higher when the battery is undercharged or the load large, lower when the battery is fully charged and the load small, and substantially constant when the amplitude of alternator voltage varies within a predictable normal operating range. This is accomplished by causing the phase of the gate-control pulses which render the rectifier circuit conductive to vary so that they occur later for larger alternator voltages, for smaller loads and for higher states of charge of the battery, and occur earlier for the opposite conditions of alternator voltage, load, and state of charge of the battery.

In accordance with the invention the desired control of the gate-control pulses is accomplished by using a relaxation oscillator circuit, preferably of the uni-junction transistor type, normally to generate gate-control pulses at a rate which is high compared with the alternator frequency in the absence of a feedback control signal applied to the oscillator circuit, and by controlling the oscillator circuit with a feedback control signal to arrest production of gate-control pulses so long as the voltage across the battery is above a predetermined level. In a preferred form of the invention, a gate-control pulse is produced each time a capacitor in the relaxation oscillator circuit is charged above a critical voltage; and the feedback control signal is produced by a feedback circuit connected between the battery and oscillator circuit and comprising a voltage breakdown device which changes between its high-conduction and low-conduction state in response to changes of battery voltage above and below said predetermined level, and a variable resistance device actuated by said changes of conduction state of the voltage breakdown device to shunt said capacitor with a low-resistance path, thereby to prevent it from charging to said critical voltage.

Accordingly, after occurrence of a given gate-control pulse the time interval before occurrence of the next gate-control pulse is longer the longer the over-voltage time for which the battery voltage remains above said predetermined level, and shorter when the over-voltage time is shorter. The adjustment of the system is such that said next gate-control pulse occurs during the next interval in which the alternator voltage is such as to tend to produce conduction through the rectifier circuit, occurring later in phase when the over-voltage time is greater and earlier in phase when the over-voltage time is smaller. As set forth hereinafter in detail, during normal operation the over-voltage time which controls the phasing of the gate-control pulses is longer the greater the alternator voltage, the lighter the load, and the more fully charged the battery, and vice versa. Accordingly when the alternator voltage becomes larger, the load smaller or the battery more fully charged, the next gate-control pulse will occur at a later phase with respect to the alternator voltage, thereby reducing the electrical power passed through the rectifier circuit to the battery and load as desired for regulation. Furthermore this reduction in supplied power reduces the over-voltage time somewhat, and the phasing of the gate-control pulses therefore stabilizes at or near a phase for which the desired regulated value of output voltage is obtained.

Preferably the feedback circuit for controlling the relaxation oscillator in response to the battery voltage comprises a zener diode arranged to break down when the battery voltage rises above a predetermined level, and a transistor having a control element supplied with current through the zener diode to be rendered conductive and having its emitter-to-collector path in shunt with the capacitor of the relaxation oscillator, so that upon the occurrence of a battery voltage greater than said predetermined level the zener diode becomes conductive, rendering the transistor conductive and thereby shunting the capacitor with a relatively low resistance. Preferably also the relaxation oscillator is a uni-junction transistor oscillator deriving its supply voltage from the alternator by way of additional rectifying means connected to the above-mentioned rectifier circuit, and the rectifier circuit and the additional rectifying means are connected to provide voltage-doubler bridge operation. Also in the preferred form, temperature stabilization is provided by means of a temperature-sensitive resistance in the feedback circuit.

While the foregoing rectifying and regulating circuit is especially advantageous in connection with the permanent-magnet alternator of the type described in the above-cited copending application, it can also be utilized in other applications in which the alternating voltage input is produced by other generating means.

Other objects and features of the invention will become more readily apparent from a consideration of the following detailed description taken in connection with the accompanying drawings, in which:

FIGURE 1 is a longitudinal sectional view showing one physical arrangement of a system in accordance with the invention;

FIGURE 2 is a sectional view of FIGURE 1 taken along the lines 2—2 with the stator structure removed; and FIGURE 3 is an electrical schematic diagram illustrating a preferred embodiment of the invention in one aspect.

Referring now to FIGURE 1, there is shown a rotational prime mover 10 such as an ordinary gasoline engine on which the alternator 12 is mounted by means of appropriate bolts 14. A suitable belt and pulley arrangement 16 operated by a rotating shaft of the motor supplies rotational power to an input shaft 18 of the alternator. Electrical output from the alternator is in this example applied across opposite terminals of a battery 20, such as a storage battery, by way of a conductive ground strap 22 and an insulated conductive cable 24.

The alternator assembly in this example consists of a main frame housing 30 having flanges 32 by which it is bolted to engine 10. An end cap 36 is mounted over one end of housing 30 by appropriate screws, and has a protruding portion 38 extending into housing 30 to which a stator assembly 40 is mounted by means of an appropriate cap screw 42. The stator assembly 40 comprises a conventional arrangement of laminated plates 44 on which windings 46 are located. The stator being conventional in form, it is unnecessary to describe it in detail, it being sufficient to point out that it will respond in the usual way to a magnetic field rotating symmetrically about the axis A—A to induce electrical voltage therein, which after rectification and regulation is applied between ground strap 22 and output cable 24. Single or multiple phase windings may be utilized in various embodiments of the invention, as will occur to one skilled in the art.

The alternator input shaft 18 is journalled in a bearing 50 supported on housing 30, and is concentric with stator assembly 40. Fixedly attached to the portion of shaft 18 inside housing 30, as by means of a press fit, is a rotor assembly 60.

The rotor assembly 60 comprises a cylindrical supporting structure 62 of a ferro-magnetic material such as steel, which is mounted concentric with alternator input shaft 18, as by spinning the ends of supporting structure 62 around the periphery of an end cap 63 press-fitted onto shaft 18. Appropriate vanes 64 may be provided on end cap 63 to force air over the stator assembly for cooling purposes. Centered on diametrically-opposed portions of the inner surface of supporting structure 62 there are mounted a pair of magnets 65 and 66 of strong magnetic material, as is shown particularly clearly in FIGURE 2; these magnets in this example are in the form of cylindrical segments having outer surfaces 68 and 70 which conform to and provide a close fit with the correspondingly-curved inner cylindrical surface regions 72 and 74 of supporting structure 62. The longitudinal positions of both of the magnets 65 and 66, and their respective lengths, are such that each lies substantially directly opposite the stator laminations 44.

The two magnets 65 and 66 are circumferentially spaced from each other about the axis of shafts 18, and different poles of the two magnets are oriented toward the stator assembly. Thus in the example shown the magnet 65 may have its inner surface as its north pole, and its outer surface in substantially-direct contact with the ferromagnetic supporting structure 62 is its south pole, while the poles of magnet 66 are oppositely oriented with respect to the stator winding and the supporting structure. Appropriate clearance is provided between the magnets and the stator so that there will be no interference with rotation of the magnets about the stator. An appropriate cement 80, such as an epoxy resin, may be provided between each of the magnets and the surrounding ferromagnetic supporting structure 62 to bond them together.

Preferably the electronic components of a rectifying and regulating circuit are mounted within the housing 30 on end cap 36 of FIGURE 1. Preferably the high-power components of the circuit, which will typically include a transformer 90 and power diodes such as 92 and 94, are mounted on a heat sink plate 95 to assist in removing heat from these components. Other circuit components, such as elements 96 and 97, may be mounted on a printed circuit board such as 98. It will be understood that no attempt is made to show in FIGURE 1 all of the components and interconnections of the circuit, which is shown in detail in FIGURE 3.

The stator windings 46 are connected to the rectifying and regulator circuit to apply alternating voltage thereto, and the rectified and regulated direct-voltage output of the rectifier and regulator is supplied by way of a suitably-insulated output terminal assembly 99 to the output cable 24 and thence to battery 20.

In the operation of the alternator, the engine 10 rotates the alternator input shaft 18 by means of belt and pulley assembly 16, which in turn rotates the cylindrical supporting structure 62 and the magnets 65 and 66 thereon about the stator 40. The latter permanent magnets serve to provide a north magnetic pole on one side of the windings and a south magnetic pole on the other, while the ferro-magnetic supporting structure 62 provides a low-reluctance magnetic return path whereby a strong magnetic field is produced between the opposed inner surfaces of the two magnets. Accordingly, as the magnets are rotated about the stator they induce an A.C. voltage in the stator windings as the magnetic flux cuts the windings. At high speeds the magnets are urged outwardly by centrifugal force against the inner surfaces of cylindrical supporting structure 62 to which they are secured, the cylindrical form of supporting structure 62 providing a support which is highly resistant to deformation by forces occurring at high speeds. Since no coils or windings are utilized on the rotating part of the alternator, there is no danger of slinging or displacing windings as often occurs in other types of alternators. At the same time the rotating vanes such as 64 induce a flow of cooling air over the stator assembly and through apertures provided in the end cap 36. Voltages induced in the stator winding are supplied to the rectifying and regulating circuit and thence by way of ground strap 22 and output cable 24 to the battery 20 which is to be charged by the rectified and regulated voltage.

Referring now to FIGURE 3, the electric and magnetic elements of the alternator 12 of FIGURE 1 are represented schematically by the magnet poles 65 and 66 disposed on opposite sides of the alternator stator winding 46. The alternator output voltage is therefore developed across the coil 46. The output of the alternator is connected to the opposite input terminals 100 and 102 of a bridge circuit comprising ordinary rectifiers 103 and 104 and gate-controlled rectifiers 106 and 108. Diodes 103 and 104 may be ordinary silicon rectifiers, while the gate-controlled rectifiers 106 and 108 may be silicon controlled rectifiers of conventional form. Silicon controlled rectifier 106 has an anode element 110, a cathode element 112 and a gate element 114, while silicon controlled rectifier 108 has an anode 116, a cathode 118 and a gate element 120. The anode element 110 of silicon controlled rectifier 106 and the cathode element 122 of diode 103 are directly connected to bridge input terminal 100, and the anode 116 of silicon controlled rectifier 108 and the cathode 126 of rectifier 104 are both connected directly to bridge input terminal 102. One output terminal 127 of the bridge circuit 128 constituted of rectifiers 106, 108, 103, 104 is connected to the negative terminal of storage battery 20 by way of a common ground connection 129 and battery lead 22, while the other output terminal 132 of the bridge is connected directly to the positive terminal of storage battery 20 by way of battery lead 24. Storage battery 20 may be an ordinary lead-acid storage battery such as is commonly utilized in automobiles.

When the silicon controlled rectifiers 106 and 108 are conducting, the operation of the bridge circuit 128 is similar to that of the well-known full wave bridge rectifier circuit of the same form in which the silicon controlled rectifiers are ordinary crystal diodes. In particular, when the upper end of alternator winding 46 is positive and its lower end negative, the lower input terminal 102 of bridge 128 is effectively connected to ground by way of the forward-biased rectifier 104, while the upper terminal of winding 46 is connected to supply positive voltage to the upper end of battery 20 by way of silicon controlled rectifier 106 when it is conducting; at the same time, the negative voltage at the lower bridge input terminal 102 causes rectifier 108 to be blocked so that it is non-conductive even if the gate element 120 thereof is actuated. When the voltage across alternator winding 46 reverses, the operations of the upper and lower halves of bridge rectifier 128 are reversed, and, when silicon controlled rectifier 108 is rendered conductive by gate-control signals applied to its gate element 120, it will pass positive voltage to the upper terminal of storage battery 20 while the input terminal 100 of bridge rectifier 128 will be essentially grounded.

Accordingly, positive half-waves of voltage are applied alternately to the anodes of the silicon controlled rectifiers 106 and 108 during successive half-cycles of the alternator output voltage, and are passed to the upper end of battery 20 during intervals in which that silicon controlled rectifier then supplied with positive voltage at its anode is rendered conductive by a gate-control pulse at its gate element. This action of the bridge rectifier 128 assures that the entire voltage between opposite ends of the alternator winding 46 is available for application to storage battery 20, rather than merely half this voltage as is the case in certain other types of bridge circuits.

Considering now the operation of the silicon controlled rectifiers in more detail, as indicated above the condition which must be met in order for current to begin to flow through either silicon controlled rectifier is that its anode be positive with respect to its cathode while its gate element is negative with respect to its cathode. However it is also characteristic of such a rectifier that, once conduction through it has been initiated in the manner described, this conduction will persist until the voltage applied between the anode and cathode elements thereof falls to a predetermined small level, even though meanwhile the negative voltage at the gate element has disappeared. The rectifier shuts itself off when its anode voltage has dropped to said predetermined voltage level. It will further be appreciated that the cathodes of both the silicon controlled rectifiers are in effect supplied with the voltage at the upper terminal of battery 20, and hence the anode-to-cathode voltage which is effective for each silicon controlled rectifier is actually the amount by which its anode voltage exceeds the contemporaneous value of the voltage at the upper terminal of the battery.

A variable resistor 134 connected in parallel with battery 20 represents in this case the load on the battery, which as pointed out above may comprise the starter for an engine or accessory electrical equipment for example. It will be appreciated that when either of the silicon controlled rectifiers is rendered conductive by the application thereto of an appropriate polarity of alternator input voltage and a gate-control pulse, the current which flows through the silicon controlled rectifiers will tend to be greater when battery 20 is at least partially discharged than when it is fully charged, greater when the value of the load resistance 134 is low than when it is high, and also greater when the alternator voltage is higher.

It is also significant to the operation of the system that the battery 20 exerts an integrating or holding elecrical effect when pulses of voltage are applied across it. That is, when a pulse of positive voltage is applied across the battery 20 by way of the bridge rectifier circuit 128, the battery voltage does not immediately return to its previous value when the pulse is done, but instead persists for a substantial interval as it decays toward its equilibrium voltage value. The time required for the battery voltage to return to a predetermined level after a given pulse is applied thereto is longer when the pulse of electrical energy applied thereto is large than when said pulse is smaller. Furthermore, when the battery is less fully charged and/or the load relatively high, the voltage produced across the battery by a given pulse applied thereto decays more rapidly than otherwise, so that the time during which the battery voltage exceeds its equilibrium value, i.e. over-voltage time, is shorter under the latter condition than when the load is light or the battery more fully charged. These differences in the over-voltage time due to changes in the alternator output voltage, in the magnitude of the load and in the charge state of the battery are utilized in a manner described hereinafter in detail to control the generation of a feedback signal for providing regulation of the electrical power output of the complete system.

Gate-control pulses for actuating the silicon controlled rectifiers are generated by means of a relaxation oscillator in which uni-junction transistor 140 is the active element. The uni-junction transistor has a first base electrode 142, a second base electrode 144 and an emitter electrode 146. Supply voltage for the oscillator is derived by means of the two diode rectifiers 148 and 150 which in conjunction with diode rectifiers 103 and 104 are connected in a common full wave bridge circuit to produce at the common terminal 152 of the two diodes 148 and 150 a full-wave rectified voltage in response to the alternator voltage output. The latter full-wave rectified voltage is supplied by way of dropping resistor 156 to a junction point 158, whence it is supplied by way of resistor 160 to emitter electrode 146 and by way of resistor 162 to second base 144 of the uni-junction transistor. Emitter 146 is connected to ground by way of capacitor 164, while first base electrode 142 is connected to ground by way of the primary winding 166 of transformer 168.

The uni-junction relaxation oscillator operates similarly to conventional circuits of the same type in the absence of feedback signals applied to emitter electrode 146 by way of resistor 169. Thus, starting with the unijunction transistor non-conductive, the full supply voltage is applied between the first and second base electrodes 142 and 144, the potential of the base 170 of the uni-junction transistor being substantially half-way between the potentials of the two base electrodes. Assuming that the capacitor 164 is initially in its discharged state, the capacitor charges through resistor 160 until it reaches a critical value substantially equal to the average of the voltage applied to the two base electrodes, at which time it becomes forwardly conductive to inject holes into the base 170 and thus to greatly reduce the resistance of the base. The result is a strong pulse of current flowing from the supply source through resistor 162 and transformer winding 166 to ground, as well as a strong current component flowing from capacitor 164 through emitter electrode 146 and winding 166 to ground. This flow discharges the capacitor and causes the transistor again to become non-conductive after which the capacitor begins to recharge. As a consequence of this a sawtooth of voltage is produced across the capacitor 164 and time-spaced current pulses are produced through winding 166, the frequency of the sawtooth oscillation and of the pulses being less for smaller values of resistor 160 and of capacitor 164. This general type of oscillator circuit is in itself well known, with the exception that in the present case the supply voltage is not steady but instead comprises a series of half-waves, so that the magnitude of the pulses through winding 166 tends to be modulated in accordance with these variations in supply voltage. However by adjusting the time constant of resistor 160 and capacitor 164 so that the pulses produced by the oscillator recur at a frequency high compared with the alternator frequency, e.g. at least ten times greater than the alternator frequency, with the exception of a small number of the oscillator pulses produced when the supply voltage is substantially zero the pulses through winding 166 can be made sufficiently large to provide the required system operation.

The pulses through winding 166 are transmitted through transformer 168 to the gate electrodes 114 and 120 of silicon controlled rectifiers 106 and 108 in the polarity to turn them on, that is to make them conductive provided that the respective anodes of the silicon controlled rectifiers are simultaneously positive with respect to their cathodes. To accomplish this there is employed a transformer secondary winding 174 having a center tap connected directly to output terminal 132 of bridge rectifier 128, the opposite ends of secondary winding 174 being connected to the gate electrodes 114 and 120 respectively. The result is that during each half-cycle of the alternator output voltage both of the silicon controlled rectifiers 106 and 108 are supplied with gate-control pulses at their respective gate electrodes, although only that one of the silicon controlled rectifiers which is at that time biased with its anode positive to its cathode will conduct.

To achieve regulation by controlling the times of occurrence of the gate-control pulses, there is employed a feedback circuit comprising an adjustably tapped resistor 180 and a temperature-sensitive resistor 182 connected in series across battery 20. A zener diode 184 is connected between the variable tap 186 of resistor 180 and the base of an NPN transistor 188; the emitter 190 of transistor 188 is connected to ground, and the collector 192 thereof is connected by way of resistor 169 to the emitter electrode 146 of the uni-junction transistor 140. The polarity of the zener diode 184 is such that it is non-conductive for low positive voltages at tap 186 but breaks down and becomes strongly conductive when the voltage at tap 186 is positive and greater than a particular predetermined value. So long as zener diode 184 remains non-conductive, transistor 188 is also non-conductive and provides no substantial shunting path in parallel with capacitor 164. However when zener diode 184 becomes conductive, transistor 188 also becomes strongly conductive and the emitter-to-collector current path of transistor 188 in series with the low-valued, current-limiting resistor 169 therefore at such times provides a low resistance shunting path across capacitor 164. So long as the latter low resistance shunting path is present, the voltage across capacitor 164 cannot build up to the above-mentioned critical voltage for which the unijunction transistor 140 becomes conductive, and accordingly gate-control pulses are not generated in winding 166 at such times. In order for a gate-control pulse to be generated it is necessary for the zener diode 184 to become non-conductive, shutting off transistor 188 and removing the shunt path on capacitor 164 so that it can again charge to its critical voltage.

The variable tap 186 of resistor 180 is normally adjusted so that, when bridge circuit 128 is completely non-conductive for a long period of time and battery 20 is fully charged, zener diode 184 will be non-conductive; but when the voltage across battery 20 is increased above a predetermined level slightly in excess of the fully-charged voltage of the battery, zener diode 184 becomes strongly conductive.

The temperature-sensitive resistor 182 has a positive coefficient of resistance so that its resistance value increases when the temperature increases. As will be described in more detail hereinafter, it therefore serves to provide a high rate of charging of battery 20 when the ambient temperature is relatively low, and a lower rate of charging when the temperature rises.

Considering now the operation of the entire system under various typical conditions of operation, there will first be considered the case in which the generator is first starting up and produces an output voltage which is lower than the then-existing battery voltage; this is the condition which will obtain for example when the engine starter is operated. Under these conditions, neither the anode of silicon controlled rectifier 106 nor the anode of silicon controlled rectifier 108 can become positive with respect to its associated cathode element, and hence neither of the silicon controlled rectifiers becomes conductive even if gate-control pulses are applied to the gate electrodes thereof. Accordingly the battery 20 and load 134 are at such times effectively disconnected from the alternator output winding 46.

However when the alternator 12 has come up to its normal operating range of speed the output thereof is sufficient to bias the anodes of silicon controlled rectifiers 106 and 108 alternately positive with respect to their associated cathode elements, and if a gate-control pulse is applied to the gate electrode of either of the silicon controlled rectifiers at such time electrical power will be passed from the alternator to the battery and load. Assuming first that the load is very small and the battery substantially fully charged, and that the alternator output voltage is relatively high, electrical power thereby applied across battery 20 and load 134 will cause the battery voltage to rise above a predetermined level for which zener diode 184 becomes conductive, and to remain at this over-voltage for a substantial time interval thereafter. Conduction through zener diode 184 then turns on transistor 188, producing a low-resistance shunt path across 164 and preventing the voltage across the latter capacitor from rising to the point where uni-junction transistor 140 can become conductive to produce another gate-control pulse, until the over-voltage has fallen to the predetermined level for which zener diode 184 again becomes non-conductive at which time the next gate-control pulse occurs. By adjustment of the position of tap 186 on variable resistor 180 the predetermined level of battery voltage for which zener diode 184 changes between its conductive and non-conductive condition can be set so that, with battery 20 fully charged and a high value of resistance of load 134, the next gate-control pulse cannot occur until the next half-cycle of alternator voltage is nearly, but not quite, ended. With this arrangement the silicon controlled rectifiers will conduct for only a relatively few electrical degrees for each half-cycle of alternator voltage, and the power delivered from the alternator by way of the bridge rectifier 128 to the battery and load will be correspondingly small because of the small time interval of conduction. However, when the load increases and/or the battery is not fully charged so that it can absorb current, the voltage produced across the battery by the alternator will be pulled down more rapidly than otherwise, resulting in a shorter period of over-voltage. As a result zener diode 184 will become non-conductive sooner after each pulse through one of the silicon controlled rectifiers, hence the transistor 188 will shut off sooner, capacitor 164 will be able to charge to its critical value sooner, and the next gate-control pulse through transformer primary winding 166 will occur somewhat earlier in the next half-cycle of alternator voltage. Because of this the fraction of each half-cycle of alternator voltage for which electrical power is transmitted to the battery and the load will be increased as desired, and the gate-control pulses will stabilize at this new value of phase relationship with respect to the alternator voltage. If the alternator voltage decreases while the load and the charged state of the battery remain the same, the over-voltage time will again decrease and the phase of the gate-control pulses will advance to provide a greater rate of delivery of power to the load and battery. Accordingly the alternator voltage is rectified and regulated against variations in load, charge state of the battery and alternator voltage magnitude.

The temperature-sensitive resistor 182 is provided for the reason that the battery is capable of receiving a higher rate of charge without damage when it is cool, as compared to when it is hot. When the temperature of the battery increases due to increases in ambient temperature, the temperature of resistor 182, which may be a thermistor for example, also increases and the resultant increase in its resistance causes zener diode 184 to break down and become conductive for smaller values of battery voltage. The effect is similar to raising the position of tap 186 on resistor 180, and, other factors being equal, causes the regulated output to stabilize at a lower value. Accordingly the desired decrease in charging rate of the battery when hot is achieved.

The entire system, including the permanent-magnet type alternator, therefore operates to produce the desired regulated direct voltage, together with temperature stabilization, without requiring brushes or commutator arrangements and with relatively simple, reliable and stable circuitry. The system also absorbs very little power when operating under conditions where maximum power transfer to the load and battery are required, rather than absorbing substantial amounts of power under such conditions as will occur in certain other types of voltage regulating systems.

While the invention has been described with specific reference to particular embodiments thereof in the interests of complete definiteness, it will be understood that it may be embodied in any of a large variety of forms diverse from those specifically described without departing from the scope and spirit of the invention as defined by the appended claims.

I claim:
1. A source of regulated direct voltage, comprising:
    an alternator comprising a fixed stator winding and a permanent-magnet rotor for producing an alternating voltage across said winding when said rotor is rotated;
    a storage battery;
    a source of electrical gate-control pulses effective in the absence of a control condition to generate said pulses at a frequency high compared with that of said alternating voltage;
    a gate-controlled rectifier circuit connected between said stator winding and said battery, supplied with said gate-control pulses, and effective to supply pulses of rectified power from said winding to said battery during intervals each beginning when said circuit is rendered conductive by the occurrence of one of said gate-control pulses contemporaneously with the occurrence of a value of said alternator voltage greater than the voltage across said battery and ending when said alternator voltage has fallen subtantially to said voltage across said battery;

said rectifier circuit comprising a first pair of diode rectifiers and a pair of gate-controlled rectifiers connected together in a first full-wave bridge-rectifier circuit and a second pair of diode rectifiers connected in a second full-wave bridge-rectifier circuit with said first pair of diode rectifiers, the output of said first bridge-rectifier circuit being supplied to said battery and the output of said second bridge-rectifier circuit being supplied to said source of gate-controlled pulses to provide operating power therefor;

said gate-controlled rectifier circuit also including transformer means having secondary windings connected to the gate elements of said gate-controlled rectifiers and having a primary winding supplied with said gate-control pulses for rendering said gate-controlled rectifiers intermittently conductive; and feedback circuit means responsive to changes in voltage across said battery for producing said control condition to arrest application of said gate-control pulses to said gate-controlled rectifier circuit during times at which said voltage across said battery exceeds a predetermined level and for permitting said application of said gate-control pulses at other times, whereby the time phase in which said gate-control pulses are applied to said gate-controlled rectifier circuit is controlled to produce regulation of said direct voltage.

2. Apparatus in accordance with claim 1, in which said source of gate-control pulses is a relaxation oscillator comprising a capacitor, means for repetitively charging said capacitor, and means for producing a gate-control pulse each time said capacitor charges to a predetermined critical voltage, and in which said feedback circuit means comprises a shunt circuit connected across said capacitor and having a resistance controllable in response to changes in said voltage of said battery to assume a low-resistance condition when said voltage of said battery exceeds said predetermined level thereof and a high-resistance condition when said voltage of said battery is below said predetermined level thereof.

3. Apparatus in accordance with claim 2, in which said shunt circuit comprises a transistor having its emitter-to-collector current path connected in parallel with said capacitor and its base electrode supplied with a control signal varying in response to variations of said voltage of said battery about said predetermined level thereof.

4. Apparatus in accordance with claim 3, in which said feedback circuit means comprises a zener diode for passing substantial current to said base electrode of said transistor only when said voltage of said battery exceeds said predetermined level thereof.

5. Apparatus in accordance with claim 4, in which said relaxation oscillator is a uni-junction transistor oscillator.

6. Apparatus in accordance with claim 4, in which said feedback circuit comprises a voltage divider circuit in parallel with said battery and having a tap connected to said base electrode by way of said zener diode, said divider including a temperature-sensitive resistor for increasing the voltage at said tap when the temperature of said resistor increases.

7. Apparatus for supplying a charge storage device with rectified and regulated direct voltage in response to an alternating voltage input, comprising:
a pair of input terminals for receiving an alternating voltage input;
a pair of output terminals connectable across a storage device to be charged;
means connecting one of said input terminals to one of said output terminals;
a source of gate-control pulses;
a rectifying gate-controlled electronic switching circuit supplied with said gate-control pulses for instituting connection of the other of said input terminals to the other of said output terminals whenever voltage of a predetermined polarity is applied across said electronic switching circuit while one of said gate-control pulses is also applied thereto and for maintaining said connection until said voltage of a predetermined polarity falls substantially to zero;
said rectifying gate-controlled electronic switching circuit comprising a first pair of diode rectifiers and a pair of gate-controlled rectifiers connected together in a first full-wave bridge-rectifier circuit and a second pair of diode rectifiers connected in a second full-wave bridge-rectifier circuit with said first pair of diode rectifiers, the output of said first bridge-rectifier circuit being connected to said storage device and the output of said second bridge-rectifier being supplied to said source of gate-control pulses to provide operating power therefor, and transformer means having secondary windings connected to the gate elements of said gate-controlled rectifiers and having a primary winding responsive to said gate-control pulses to render said gate-controlled rectifiers intermittently conductive; and
means responsive to the voltage between said output terminals for inhibiting generation of gate-control pulses by said source so long as said voltage between said output terminals is of a particular polarity and greater than a predetermined level.

8. Apparatus in accordance with claim 7, in which said source comprises a uni-junction transistor oscillator including a capacitor and effective to produce a gate-control pulse each time the voltage across said capacitor exceeds a critical value, and in which said inhibiting means comprises a transistor having its emitter-to-collector path in parallel with said capacitor and a zener diode having one terminal connected to the base of said transistor and its other terminal supplied with voltage varying in accordance with said voltage between said output terminals.

9. Apparatus in accordance with claim 8, comprising a temperature-sensitive resistor connected to change said voltage supplied to said zener diode in accordance with changes in ambient temperature.

References Cited by the Examiner
UNITED STATES PATENTS

| | | | |
|---|---|---|---|
| 3,059,167 | 10/1962 | Byles | 322—73 X |
| 3,121,837 | 2/1964 | Holm et al. | 320—35 X |
| 3,124,738 | 3/1964 | Smith et al. | 321—14 |
| 3,160,805 | 12/1964 | Lawson | 320—39 |
| 3,179,871 | 4/1965 | Bagno | 320—30 |

JOHN F. COUCH, *Primary Examiner.*

S. WEINBERG, *Assistant Examiner.*